United States Patent
Xu et al.

(10) Patent No.: US 11,880,961 B2
(45) Date of Patent: Jan. 23, 2024

(54) SPECTRAL HINT-BASED INPAINTING OF IMAGES

(71) Applicant: Picsart, Inc., Hallandale Beach, FL (US)

(72) Inventors: Xingqian Xu, Kirkland, WA (US); Shant Navasardyan, Yerevan (AM); Vahram Tadevosyan, Yerevan (AM); Andranik Sargsyan, Yerevan (AM); Humphrey Shi, Princeton Junction, NJ (US)

(73) Assignee: PICSART, INC., Hallandale Beach, FL (US)

( * ) Notice: Subject to any disclaimer, the term of this patent is extended or adjusted under 35 U.S.C. 154(b) by 0 days.

(21) Appl. No.: 18/196,640

(22) Filed: May 12, 2023

(65) Prior Publication Data

US 2023/0368341 A1 Nov. 16, 2023

Related U.S. Application Data

(60) Provisional application No. 63/341,799, filed on May 13, 2022.

(51) Int. Cl.
*G06K 9/00* (2022.01)
*G06T 5/00* (2006.01)
(Continued)

(52) U.S. Cl.
CPC ............. *G06T 5/005* (2013.01); *G06T 5/10* (2013.01); *G06T 5/20* (2013.01); *G06T 2207/20048* (2013.01); *G06T 2207/20081* (2013.01)

(58) Field of Classification Search
CPC .. G06T 5/005; G06T 5/10; G06T 5/20; G06T 2207/20048; G06T 2207/20081
See application file for complete search history.

(56) References Cited

U.S. PATENT DOCUMENTS

| 8,861,868 B2 | 10/2014 | Shechtman et al. |
| 10,290,085 B2 | 5/2019 | Lin et al. |

(Continued)

FOREIGN PATENT DOCUMENTS

| WO | WO-2020101246 A1 * | 5/2020 | .......... G06K 9/6264 |
| WO | WO-2020108358 A1 * | 6/2020 | .......... G06K 9/4671 |
| WO | WO-2022081821 A1 * | 4/2022 | |

OTHER PUBLICATIONS

Learning with tensors: a framework based on convex optimization and spectral regularization, Marco Signoretto et al.,Springer, May 2013, pp. 303-351 (Year: 2013).*

(Continued)

*Primary Examiner* — Jayesh A Patel
(74) *Attorney, Agent, or Firm* — Arluys IP, P.C

(57) ABSTRACT

Techniques are described for the inpainting of an image with a missing region. In an embodiment, the process transforms an input image tensor of the image into a spectral tensor of the image. A machine learning-generated filter is applied to the spectral tensor of the image. Additionally or alternatively, a spectral tensor is spectrally split into at least high-frequency and low-frequency sub-tensors. The output tensor(s) are then inverse-transformed into the spatial domain, yielding pixel data for the unknown region that accurately regenerates both low-level detail information as well as high-level detail information.

20 Claims, 10 Drawing Sheets

(51) Int. Cl.
  G06T 5/10    (2006.01)
  G06T 5/20    (2006.01)

(56) References Cited

U.S. PATENT DOCUMENTS

| | | | |
|---|---|---|---|
| 11,521,304 B1* | 12/2022 | Navasardyan | G06T 5/005 |
| 2017/0024864 A1* | 1/2017 | Karande | G06T 7/337 |
| 2019/0236759 A1* | 8/2019 | Lai | G06N 3/047 |
| 2019/0355102 A1* | 11/2019 | Lin | G06F 18/213 |
| 2021/0133936 A1* | 5/2021 | Chandra | G06V 10/774 |
| 2021/0150678 A1* | 5/2021 | Yi | G06N 3/084 |
| 2021/0183022 A1* | 6/2021 | Wang | G06N 7/01 |
| 2022/0156897 A1* | 5/2022 | Jeong | G06N 3/045 |

OTHER PUBLICATIONS

Band-limited Training and Inference for Convolutional Neural Networks, Adam Dziedzic et al., ICOML, 2019, pp. 1-10 (Year: 2019).*

Unsupervised Deep Image Fusion With Structure Tensor Representations, Hyungjoo Jung et al, IEEE, 2020, pp. 3845-3858 (Year: 2020).*

890Tensor Methods in Computer Vision and Deep Learning, Yannis Panagakis et al, IEEE, 2021, pp. 863-890 (Year: 2021).*

Spatial-Spectral Total Variation Regularized Low-Rank Tensor Decomposition for Hyperspectral Image Denoising, Haiyan Fan et al., IEEE, 2018, pp. 6196-6213 (Year: 2018).*

Automatic Colorization of Anime Style Illustrations Using a Two-Stage Generator, Yeongseop Lee et al., MDPI, 2020, pp. 1-16 (Year: 2020).*

Oh, Seoung Wug, et al. "Onion-peel networks for deep video completion." Proceedings of the IEEE/CVF International Conference on Computer Vision. 2019.(Year: 2019).

Zhang, Haoran, et al. "Semantic image inpainting with progressive generative networks." Proceedings of the 26th ACM International conference on Multimedia. 2018. (Year: 2018).

Guo, Zongyu, et al. "Progressive image inpainting with full-resolution residual network." Proceedings of the 27th ACM International conference on Multimedia. 2019. (Year: 2019).

Li, Jingyuan, et al. "Progressive reconstruction of visual structure for image inpainting." Proceedings of the IEEE/CVF International Conference on Computer Vision. 2019 (Year: 2019).

Barnes, Connelly, et al. "The patchmatch randomized matching algorithm for image manipulation." Communications of the ACM 54.11 (2011): 103-110. (Year: 2011).

Chi, Lu, et al. "Fast Fourier Convolution", 34th Conference on Neural Information Processing Systems (NeurIPS 2020), Vancouver, Canada. (Year: 2020).

Suvorov, Roman, et al. "Resolution-robust Large Mask Inpainting with Fourier Convolutions". Winter Conference on Applications of Computer Vision (WACV 2022). (Year: 2022).

Zhao, Shengyu, et al. "Large Scale Image Completion Via Co-Modulated Generative Adversarial Networks", Published as a conference paper at ICLR 2021 (Year: 2021).

U.S. Appl. No. 17/745,900, filed May 17, 2022, Notice of Allowance dated Aug. 17, 2023.

U.S. Appl. No. 18/070,494, filed Nov. 29, 2022, Non-Final Office Action dated Oct. 3, 2023.

Xie C, et al. (2019) Image inpainting with learnable bidirectional attention maps. In: 2019 IEEE/CVF International Conference on Computer Vision (ICCV), pp. 8857-8866.

Efros AA, et al. (2001) Image quilting for texture synthesis and transfer. In: Proceedings of the 28th Annual Conference on Computer Graphics and Interactive Techniques, Association for Computing Machinery, New York, NY, USA, Siggraph '01, p. 341-346, DOI 10.1145/383259.383296, URL https://doi.org/10.1145/383259.383296.

Yan Z, et al. (2018) Shift-net: Image inpainting via deep feature rearrangement. In: The Euro pean Conference on Computer Vision (ECCV).

Efros A, et al. (1999) Texture synthesis by nonparametric sampling. In: IEEE International Conference on Computer Vision, Corfu, Greece, Sep. 1999.

Zhou B, et al. (2017) Places: A 10 million image database for scene recognition. IEEE transactions on pattern analysis and machine intelligence 40(6): 1452-1464.

Harrison P (2001) A non-hierarchical procedure for resynthesis of complex textures. In: Skala V (ed) Proceedings of The 9-th International Conference in Central Europe on Computer Graphics, Visualization and Computer Vision'2001, University of West Bohemia, pp. 190-197, URL http://wscg.zcu.cz/wscg2001/wscg2001.htm, international Conferences in Central Europe on Computer Graphics, Visualization and Computer Vision 2001, WSCG 2001 ; Conference date: May 2, 2001 Through Sep. 2, 2001.

Kingma DP, et al. (2015) Adam: A method for stochastic optimization. CoRR abs/1412.6980.

Vaswani A, et al. (2017) Attention is all you need. In: Advances in Neural Information Processing Systems 30, Curran Associates, Inc., pp. 5998-6008, URL http://papers.nips.cc/paper/7181-attention-is-all-you-need.pdf.

Liu H, et al. (2019) Coherent Semantic Attention for Image Inpainting. In: 2019 IEEE/CVF International Conference on Computer Vision (ICCV), pp. 4170-4179.

Pathak D, et al. (2016) Context encoders: Feature learning by inpainting. In: 2016 IEEE Conference on Computer Vision and Pattern Recognition (CVPR), pp. 2536-2544.

Song Y, et al. (2018) Contextual-based image inpainting: Infer, match, and translate. In: Proceedings of the European Confer Conference on Computer Vision (ECCV), pp. 3-19.

Nazeri K, et al. (2019) Edgeconnect: Generative Image Inpainting with Adversarial Edge Learning. In: ICCV Workshops.

Hung J, et al. (2008) Exemplar-based image inpainting base on structure construction. In: Journal of Software 3, DOI 10.4304/jsw.3.8.57-64.

Clevert DA, et al. (2015) Fast and accurate deep network learning by exponential linear units (elus). CoRR abs/1511.07289.

Boykov Y, et al. (2001) Fast approximate energy minimization via graph cuts. IEEE Transactions on Pattern Analysis and Machine Intelligence 23(11): 1222-1239.

Chen TQ, et al. (2016) Fast patch-based style transfer of arbitrary style. arXiv preprint arXiv:161204337.

Wei LY, et al. (2000) Fast texture synthesis using treestructured vector quantization. In: Proceedings of the 27th Annual Conference on Computer Graphics and Interactive Techniques, ACM Press/Addison-Wesley Publishing Co., USA, Siggraph '00, p. 479-488, DOI 10.1145/344779.345009, URL https://doi.org/10.1145/344779.345009.

Xiong W, et al. (2019) Foreground-aware image inpainting. In: The IEEE Conference on Computer Vision and Pattern Recognition (CVPR).

Yu J, et al. (2019) Freeform image inpainting with gated convolution. In: 2019 IEEE/CVF International Conference on Computer Vision (ICCV), pp. 4470-4479.

Goodfellow IJ, et al. (2014) Generative adversarial nets. In: Proceedings of the 27th International Conference on Neural Information Processing Systems—vol. 2, MIT Press, Cambridge, MA, USA, NIPS'14, p. 2672-2680.

Yu J, et al. (2018) Generative image inpainting with contextual attention. In: 2018 IEEE/CVF Conference on Computer Vision and Pattern Recognition, pp. 5505-5514.

Izuka S, et al. (2017) Globally and locally consistent image completion. ACM Transactions on Graphics 36:1-14, DOI 10.1145/3072959.3073659.

Kwatra V, et al. (2003) Graphcut textures: Image and video synthesis using graph cuts. ACM Trans Graph 22:277-286, DOI 10.1145/1201775.882264.

Yang C, et al. (2016) High-resolution image inpainting using multi-scale neural patch synthesis. arXiv preprint arXiv: 161109969v2.

(56) References Cited

OTHER PUBLICATIONS

Huang JB, et al. (2014) Image completion using planar structure guidance. ACM Trans Graph 33(4), DOI 10.1145/2601097. 2601205, URL https://doi.org/10.1145/2601097.2601205.

Sun J, et al. (2005) Image completion with structure propagation. ACM Trans Graph 24(3):861-868, DOI 10.1145/1073204.1073274, URL https://doi.org/10.1145/1073204.1073274.

Xie J, et al. (2012) Image denoising and inpainting with deep neural networks. In: Proceedings of the 25th International Conference on Neural Information Processing Systems—vol. 1, Curran Associates Inc., Red Hook, NY, USA, NIPS'12, p. 341-349.

Liu G, et al. (2018) Image inpainting for irregular holes using partial convolutions. In: ECCV Luong T, Pham H, Manning CD (2015) Effective approaches to attention-based neural machine translation. In: Proceedings of the 2015 Conference on Empirical Methods in Natural Language Processing, Association for Computational Linguistics, Lisbon, Portugal, pp. 1412-1421, DOI 10.18653/v1/D15-1166, URL https://www.aclweb.org/anthology/D15-1166.

Bertalmio M, et al. (2000) Image inpainting. In: Siggraph '00.

Zhou Wang, et al. (2004) Image quality assessment: from error visibility to structural similarity. IEEE Transactions on Image Processing 13(4):600-612.

Gatys LA, et al. (2016) Image style transfer using convolutional neural networks. In: Proceedings of the IEEE conference on computer vision and pattern recognition, pp. 2414-2423.

Kohler R, et al. (2014) Mask-specific inpainting with deep neural networks. In: German Conference on Pattern Recognition, Springer International Publishing, Cham, pp. 523-534.

Criminisi A, et al. (2003) Object removal by exemplar-based inpainting. vol. 2, pp. 721-728, DOI 10.1109/CVPR.2003.1211538, URL https://www.microsoft.com/en-us/research/wp-content/uploads/2016/02/criminisi_cvpr2003.pdf.

Barnes C, et al. (2009) PatchMatch: A randomized correspondence algorithm for structural image editing. ACM Transactions on Graphics (Proc Siggraph) 28(3) Bello I, et al. (2019) Attention augmented convolutional networks. In: 2019 IEEE/CVF International Conference on Computer Vision (ICCV), pp. 3285-3294.

Zheng C, et al. (2019) Pluralistic image completion. 2019 IEEE/CVF Conference on Computer Vision and Pattern Recognition (CVPR) pp. 1438-1447.

Lin Liang (2001) Real-Time Texture Synthesis by Patch-Based Sampling. In: ACM Transactions on Graphics, vol. 20, No. 3, Jul. 2001, pp. 127-150.

Criminisi A, et al. (2004) Region filling and object removal by exemplar-based image inpainting. Trans Img Proc 13 (9):1200-1212, DOI 10.1109/TIP. 2004.833105, URL https://doi.org/10.1109/TIP.2004.833105.

Zhang H, et al. (2019) Self-attention generative adversarial networks. In: Proceedings of the 36th International Conference on Machine Learning, PMLR, Long Beach, California, USA, Proceedings of Machine Learning Research, vol. 97, pp. 7354-7363, URL http://proceedings.mlr.press/v97/zhang19d.html.

Yeh RA, et al. (2017) Semantic image inpainting with deep generative models. In: 2017 IEEE Conference on Computer Vision and Pattern Recognition (CVPR), pp. 6882-6890.

Ren JSJ, et al. (2015) Shepard convolutional neural networks. In: Advances in Neural Information Processing Systems 28 (NIPS 2015).

Bertalmio M, et al. (2003) Simultaneous structure and texture image inpainting. IEEE Transactions on Image Processing 12(8):882-889.

Miyato T, et al. (2018) Spectral normalization for generative adversarial networks. In: International Conference on Learning Representations, URL https://openreview.net/forum?id=B1QRgziT.

Song Y, et al. (2018) Spg-net: Segmentation prediction and guidance network for image inpainting. CoRR abs/1805.03356, URL http://arxiv.org/abs/1805.03356, 1805.03356.

Ashikhmin M (2001) Synthesizing natural textures. In: Proceedings of the 2001 Symposium on Interactive 3D Graphics, Association for Computing Machinery, New York, NY, USA, I3D '01, p. 217-226, DOI 10.1145/364338.364405, URL https://doi.org/10.1145/364338.364405.

Neuhold G, et al. (2017) The Mapillary Vistas Dataset for Semantic Understanding of Street Scenes. In: 2017 IEEE/CVF Conference on Computer Vision and Pattern Recognition, pp. 4990-4999.

Simonyan K, et al. (2015) Very deep convolutional networks for large-scale image recognition. In: Bengio Y, LeCun Y (eds) 3rd International Conference on Learning Representations, ICLR 2015, San Diego, CA, USA, May 7-9, 2015, Conference Track Proceedings, URL http://arxiv.org/abs/1409.1556.

* cited by examiner

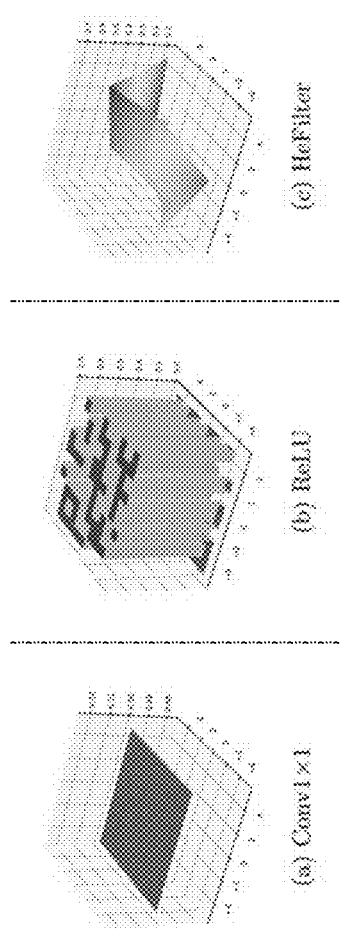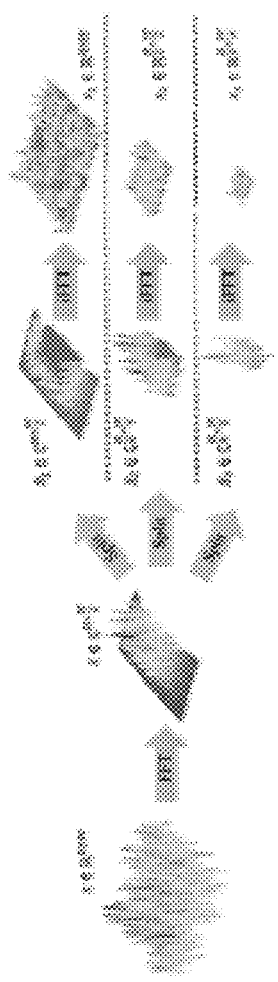
FIG. 4A  FIG. 4B  FIG. 4C  FIG. 4D

SPECTRAL HINT-BASED INPAINTING OF IMAGES

BENEFIT CLAIM

This application claims the benefit under 35 U.S.C. § 119(e) of provisional patent application 63/341,799, filed May 13, 2022, the entire content of which is hereby incorporated by reference for all purposes as if fully set forth herein.

FIELD OF THE TECHNOLOGY

The present invention relates to the field of image processing, in particular to spectral hint-based inpainting of images.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Image inpainting techniques of image processing are necessary for the recovery and repair of missing or damaged portions of an image. A large number of digital images that are produced by digitalizing film photography include damaged portions. Such damaged portions may be the result of the physical wear and tear of the photograph or the usage of subpar/antiquated photographic or scanning equipment. The damage may include cracks, worn-out portions, and/or over-exposed/under-exposed areas.

More importantly, image inpainting techniques are necessary for digital image editing for object removal from a digital image. Indeed, many state-of-the-art photo-editing tools allow a user to mask one or more objects within a digital image and perform object removal. The region of the image, after the object removal, the missing region, has to be inpainted to restore the image.

Such restored image has to be visually plausible; thus, the inpainting techniques have to yield an output that:
- has semantically correct logic, i.e., the generated objects or their parts should be logically possible.
- preserves the structures in the image after the inpainting; i.e., the lines and curves in the known region should be continued to the generated region.
- generates textures that are visually realistic and coherent with the textures in the known region.

For example, one set of inpainting approaches is based on texture synthesis techniques and is successful in meeting the realistic-look texture criterion. Due to the patch-based nature, these approaches may also meet the criterion of preserving structural continuities. However, for complex structures, these approaches fail to achieve semantically correct outputs.

To remedy this failure, deep machine-learning techniques with vanilla convolutions may be used. Because the convolution operations use sliding windows of pixels to operate on, the missing or invalid pixels in the sliding windows are treated as useful information by the operation. Accordingly, while these approaches achieve semantically meaningful results for small missing regions in images, for complex real-world images, these approaches may introduce blur, structural distortions, edge artifacts, and color inconsistencies.

On the other hand, the special block approaches may avoid the issue of invalid/missing information by ignoring the values of the missing region in images. However, by just ignoring the missing pixels, these specially designed blocks process only local neighborhoods of missing pixels instead of analyzing larger regions. Such processing causes difficulties in obtaining semantically meaningful results. Accordingly, the approach may introduce distortion into the restored region for complex images.

Furthermore, the above-mentioned approaches may complete the missing region in a one-shot manner in which all missing pixels are filled simultaneously without any order. However, the one-shot approaches lead to structural distortions. For example, deep learning networks may fail to progressively make continuity-preserving coarse estimations, which leads to output images with structural discontinuities.

BRIEF DESCRIPTION OF THE DRAWINGS

In the drawings of certain embodiments in which like reference numerals refer to corresponding parts throughout the figures:

FIG. 4A is a graph that depicts the Conv1×1 function applied over the frequency domain, in an embodiment;

FIG. 4B is a graph that depicts a ReLU function applied over the frequency domain, in an embodiment;

FIG. 4C depicts a graph of a smooth varying function of a heterogeneous filter in the frequency domain, in an embodiment;

FIG. 4D is a graphic illustration that depicts a Gaussian split, in an embodiment;

DETAILED DESCRIPTION

Figure 1A:
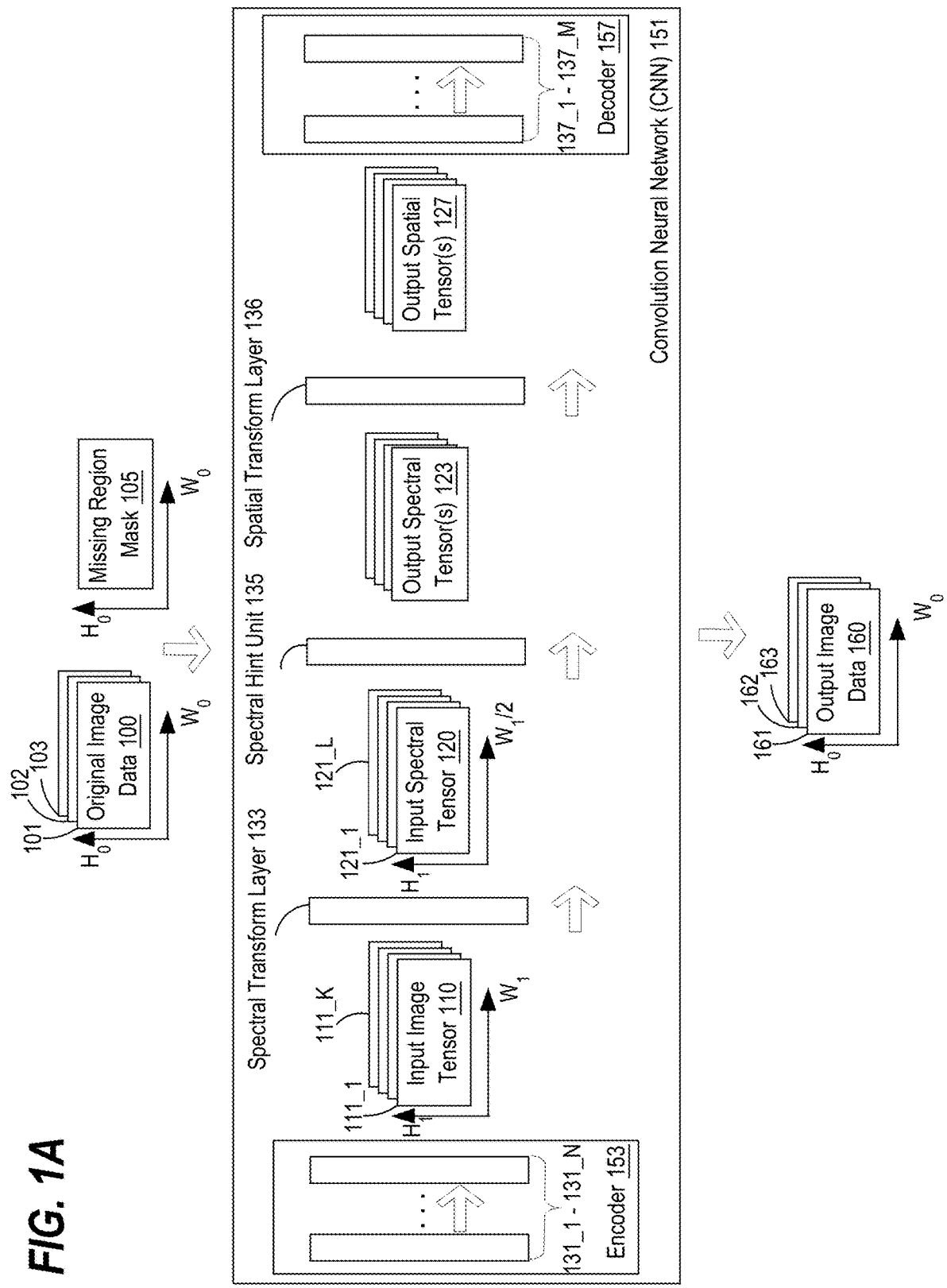
FIGS. 1A and 1B are block diagrams depicting data flow and a system for image inpainting with a spectral hint unit, in one or more embodiments.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe spectral-hint-based inpainting of digital images. To inpaint a missing region, digital image data is converted to spectral image data. The term "image data" refers herein to a tensor of pixel data units of a digital image. Each matrix in a tensor is a channel of image data with a corresponding dimension (height and width). In the original image data, such channels may RBG (Red, Blue, Green) and each pixel data unit may contain the corresponding color value. However, the tensor of image data may be transformed to a different number of channels with a different dimension (i.e., width and/or height). Such transformation(s) may also be referred to herein as encoding while transforming back to the intermediate(s) and/or original tensor of color value matrices is referred to herein as decoding.

Techniques are described herein for spectrally transforming an image tensor (encoded or original) into corresponding spectral tensor(s) and performing processing on the spectral tensor(s) in the frequency domain for image inpainting. In an embodiment, an image tensor is spectrally transformed by using the width and/or height as a spatial domain (2D transform). Accordingly, in such an embodiment, each channel matrix in the tensor may be transformed into two respective spectral channel matrices for the width and height.

In an embodiment, a heterogenous filter is applied to a spectral tensor of an image. Techniques described herein generate the heterogenous filter by training weights for a subset of the points/vectors of spectral tensor to alter. The alteration weights may be trained as part of the training parameters of other layers in a neural network. Once the weights for the selected subset of data points/vectors are derived, the heterogeneous filter for the full spectral tensor is generated. The heterogeneous filter is generated by determining the alteration weight values for the other points/vectors based on fitting using linear interpolation or regression techniques.

Additionally, or alternatively, the spectral tensor of image data may be spectrally split based on the frequency bands in the spectral domain of the tensor. Each band corresponds to a particular range of frequency magnitudes. For example, the spectral tensor may be split into three levels: two high-magnitude bands and one low-magnitude frequency band.

The spectral split may be performed by applying one or more low-pass, high-pass and/or band-pass filter functions on the original spectral tensor. The functions may be applied sequentially to generate the corresponding band-specific tensors. In the frequency domain, such filter application(s) are equivalent to selecting sub-portions of the tensors that correspond to the height and width of the corresponding frequency band. Because of such segregation of the spectral tensor into sub-tensors of corresponding frequency bands, when converted to the spatial domain, the lower frequency details are processed in the layer of the decoder that corresponds to less informationally dense portions of the image, and vice versa.

In an embodiment, each split-generated spectral vector may be normalized to a distribution. The parameter(s) (e.g., the standard deviation for Gaussian distribution) of the distribution may be based on the resolution of the image data or determined by a machine learning technique. For example, a Gaussian map may be applied with a standard deviation determined by the resolution of the input image. The application of the Gaussian map may provide a Gaussian smooth filter in the corresponding spatial domain. Accordingly, when each band-specific normalized sub-tensors is transformed to the spatial domain, the transitions from low-level detail to high-level detail are smoother, thereby anti-aliasing the output image data.

The split-generated spectral band tensors are converted by inverse transformation (e.g., iFFT) to the corresponding spatial sub-tensors. The converted spatial sub-tensors may be converted by the decoder into output image data. Additionally, or alternatively, the spatial subtensor(s) may be merged with tensors being processed by the layers of the decoder before the final image data is generated. Different spatial sub-tensors may be merged at different layers of the decoder based on the level of detail that the layer of the decoder is processing.

For example, a decoder layer with a smaller dimension tensor input may be processing the lower-level detail information, and thus, the spatial sub-tensor corresponding to a lower frequency is merged with the layer's tensor. On the other hand, a decoder layer with a larger dimension tensor input may be processing higher-level detail information, and thus, the spatial sub-tensor corresponding to a higher frequency is merged with the layer's tensor.

Machine Learning System

Figure 1B:
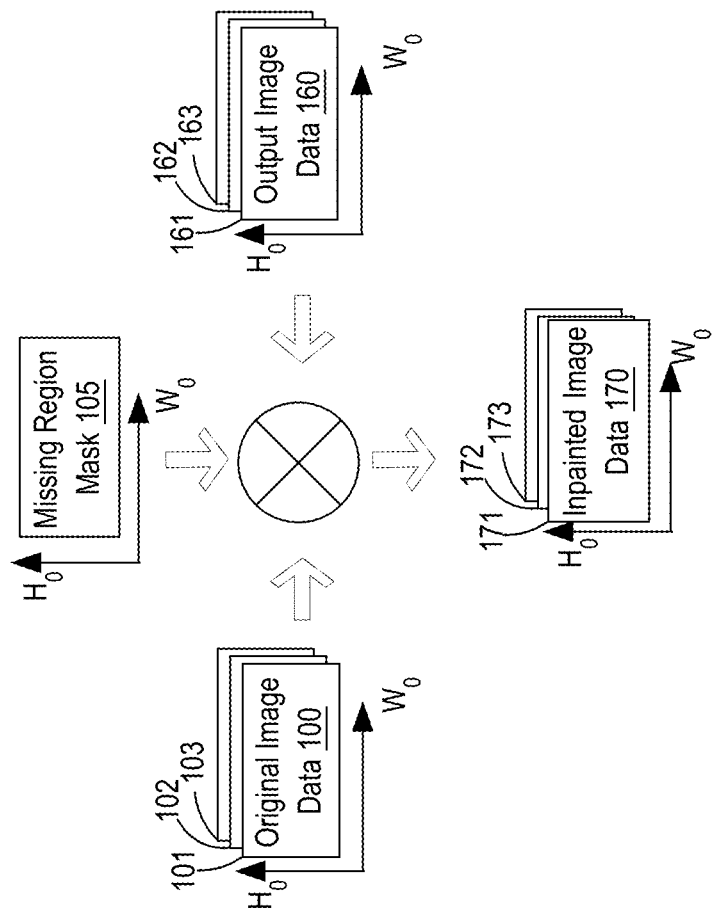

FIGS. 1A and 1B are block diagrams depicting data flow and a system for image inpainting with a spectral hint unit, in one or more embodiments. Input for the system is original image data 100, which includes channels 101, 102, and 103 of an initial pixel-wise size of $H_0$ and $W_0$. Each of channels 101, 102, and 103 may correspond to channel values for red, green, and blue pixels. Other types of image data may also be used by the system, such as image data containing CMYK channels for pixels.

Figure 2:
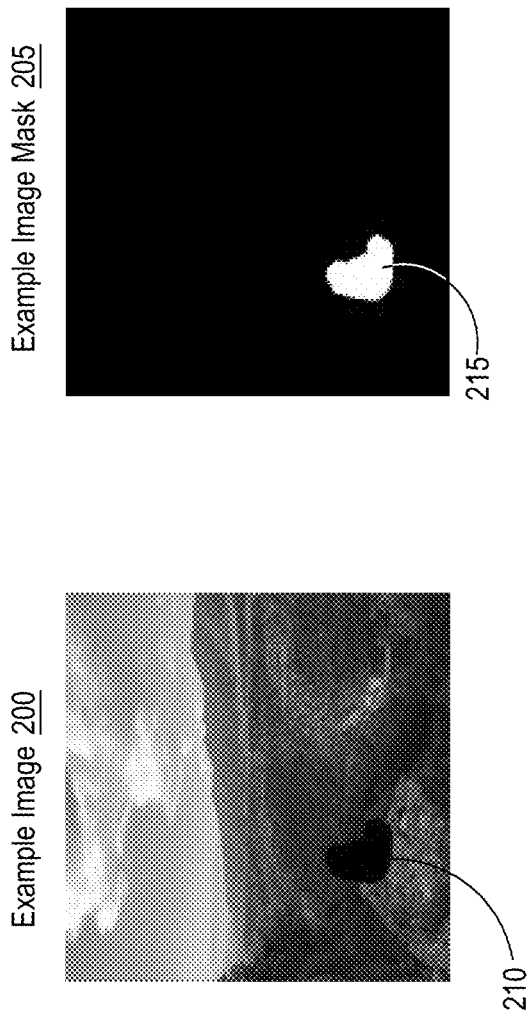
FIG. 2 depicts an original image and an original image mask, in an embodiment.

The missing region of original image data 100 may be indicated by the original missing region mask 105. FIG. 2 depicts an original image and an original image mask, in an embodiment. Example image 200 may have height $H_0$ and width $W_0$, the missing region being depicted by region 210 having values of zero. Original missing region mask 205 is a matrix of the same size of height $H_0$ and width $W_0$, as example image 200, having values of one (1) for the missing region 215 and zero (0) for known regions. The locations of values of one correspond to the missing region 210 and the locations of values of zero to known regions, respectively, in example image 200.

Original image data 100 and original missing region mask 105 are provided to a machine learning system that implements a machine learning algorithm such as convolutional neural network 151. CNN 151 may contain an encoder performing various convolutions at different layers using different strides and different kernels of various sizes. The kernel values may be trainable parameters that are trained using a training data set of images and image masks. Such trainable parameters may be trained for the whole CNN, all layers at once. Similarly, CNN 151 may contain decoder 157 that includes corresponding deconvolution layers, upsampling layer(s), activation function layer(s), batch normalization layer(s) and/or skip connection(s).

For example, encoder 153 of CNN 151 contains layers 131_1 through 131_N, and decoder 157 contains layers 137_1 through 137_M, performing one or more of the above-mentioned functions on the input image tensor. The numeral N and M are numbers denoting the corresponding number of layers in encoder 153 and decoder 157, respectively. Layer 131_1 has original image data 100 and original mask 105 as input. When a convolution is performed on original image data 100 in a convolution layer, the size and channels of the image data may change. Each layer may be arranged serially in sequence such that the output of the earlier layer in the sequence is the input for the later layer in the sequence.

For example, in FIG. 1, encoder 153 having one or more convolution layers of layers 131_1 ... N performs convolution(s) on original image data 100, which may produce input image tensor 110 with a different size $H_1/W_1$ and different channels 111_1 through 111_K. The number of channels, K, in channels 111_1-111_K is derivative of the original channels 101 ... 103 of original image data 100. Other embodiments are possible, in which either layers 131_1 through 131_N are not implemented, or layers 137_1 through 137_M are not implemented.

In an embodiment, CNN 151 contains spectral transform layer 133, spectral hint unit 135, and spatial transform layer 136. Spectral transform layer 133 performs the transformation of input image tensor 110 from the spatial domain to the frequency domain, generating input spectral tensor 120. Each spatial domain channel matrix (e.g., 111_1 through 111_K) is converted using the spectral transform function using width and/or height as an absolute value in the spatial domain to generate the corresponding spectral channel matrix (e.g., 121_1 through 121_L). In an embodiment, the width of each dimension is halved as a result of ignoring complex conjugates and the number of channels L=2×K due to spectral transform along both the width and the length of spatial matrices 111_1-111_K.

The spectral transform layer 133 may use various spectral transform functions to perform the spectral transform. The non-limiting examples include:

Fourier Transform: The Fourier Transform is a technique that decomposes an image into its constituent frequencies, converting an image from the spatial domain to the frequency domain, where the image is represented as a complex-valued function of frequency components (magnitude and phase). An example of a Fourier Transform is a Fast Fourier Transform (FFT). When using Fourier Transform, the generated spectral channel matrix may contain an asymmetry along each dimension (width and height) because the spectral transform of spatial domain tensor, $\mathbb{R}^{K \times H \times W}$, is the spectral tensor, $\mathbb{C}^{K \times H \times W/2}$, and has half-width due to the skipped half being the reflected complex conjugate. Each of the K channel matrices of the spectral tensor may contain two sub-channels (two matrices) because the complex-valued spectral values of the matrix in each channel have a real and imaginary component, resulting in two sub-channels for each channel. The real component is the magnitude (strength) of the frequency, and the imaginary component represents the phase (orientation) of the frequency. Although many embodiments herein may refer to Fourier Transform or FFT, any other spectral transform function may be used, such as those described below.

Discrete Cosine Transform (DCT): This transform is similar to the Fourier Transform, but it uses only cosine functions to represent the frequency components of an image.

Wavelet Transform: This transform decomposes an image into a set of wavelet functions, which are localized in both the time and frequency domains.

Radon Transform: This transform is used to compute the line integrals of an image along a set of predetermined directions.

Hough Transform: This transform is used to detect and extract features in an image that may be parameterized as lines or curves.

In an embodiment, CNN 151 contains spectral hint unit 135. Spectral hint unit 135 performs the techniques described herein for providing spectral processing for the inpainting of images. Spectral hint unit 135 receives input spectral tensor 120 and processes its frequency domain components to improve the inpainting output. Spectral hint unit 135 may include a single-value kernel convolution layer (Conv1×1), a ReLU layer, a heterogenous filter, a spectral split layer and any combination of one or more of such layers.

Spectral hint unit (SHU) 135 may transform input spectral tensor 120 to output spectral tensor(s) 123 by spectrally splitting and/or performing magnitude/phase adjustment on input spectral tensor 120. Spectral hint unit 135 thereby generates spectral output tensor(s) 123, which have been spectrally adjusted to provide spectrally aware (spectral hint-based) inpainting of the original image data 100 when converted back to the spatial domain.

For example, when SHU 135 uses heterogeneous filtering techniques (HeFilter), ReLU and convolution with kernel 1×1 (Conv1×1), then let $x \in \mathbb{R}^{N \times H \times W}$ be an N channeled input spectral tensor 120 with height and width equal to H and W, respectively. Then the output of SHU 135 is the tensor x' with the same dimensionality formed in the following way:

$$x' = \text{concat}(x_{[0 \ldots N-K]}, x_{[N-K \ldots N]} + f(x_{[N-K \ldots N]}))$$

$$f = \text{iFFT} \circ g \circ \text{FFT}$$

$$g = \text{HeFilter} \circ \text{ReLU} \circ \text{Conv1} \times 1$$

Spatial transform layer 136 transforms output spectral tensor(s) 123 to output spatial tensor(s) 127. Spatial transform layer 136 utilizes the inverse of the algorithm used to obtain the initial spectral tensor, input spectral tensor 120, by spectral transform layer 133. For example, for FFT-based spectral transform layer 133, spatial transform layer 136 utilizes the inverse FFT (iFFT) to generate output spatial tensor(s) 127.

In an embodiment, decoder 157, using output spatial tensor(s) 127, transforms the tensors to the same dimensions as the original image data 100. Decoder 157 merges output spatial tensor(s) 127 at the appropriate layer of layers 131_1-131_M to match the dimensions of the spatial tensor. The merging may be performed by simple matrix addition, but other operations, such as concatenation, may be used.

In an embodiment, output image data 160 is the output of CNN 151 and has the same size H0/W0 and the same number of channels, albeit with the corresponding channel values in channels 161, 162, and 163.

FIG. 1B is a block diagram that depicts generating of an inpainted image, in an embodiment. Output image data 160 is combined with original image data 100 such that the pixel data units for the missing region indicated by original missing region mask 105 are selected from output image data 160. The rest of the pixel data units are selected from the original image data 100. Based on such combination, inpainted image data 170 is generated having the same number channels 171-173 corresponding to original image data 100 channels 101, 102, 103 and output image data 160 channels 161, 162, 163.

In an embodiment, the inpainting system may contain multiple CNNs. For example, one CNN may produce a course output image data, at least a portion of which data is provided as input to the next CNN. The next CNN produces refined output image data. In such an embodiment, inpainted image data 170, along with original missing region mask 105, is provided as input to another CNN to generate refined image data, and/or CNN 151 receives an input image tensor from another, e.g., more coarse CNN.

Functional Overview

Figure 3:
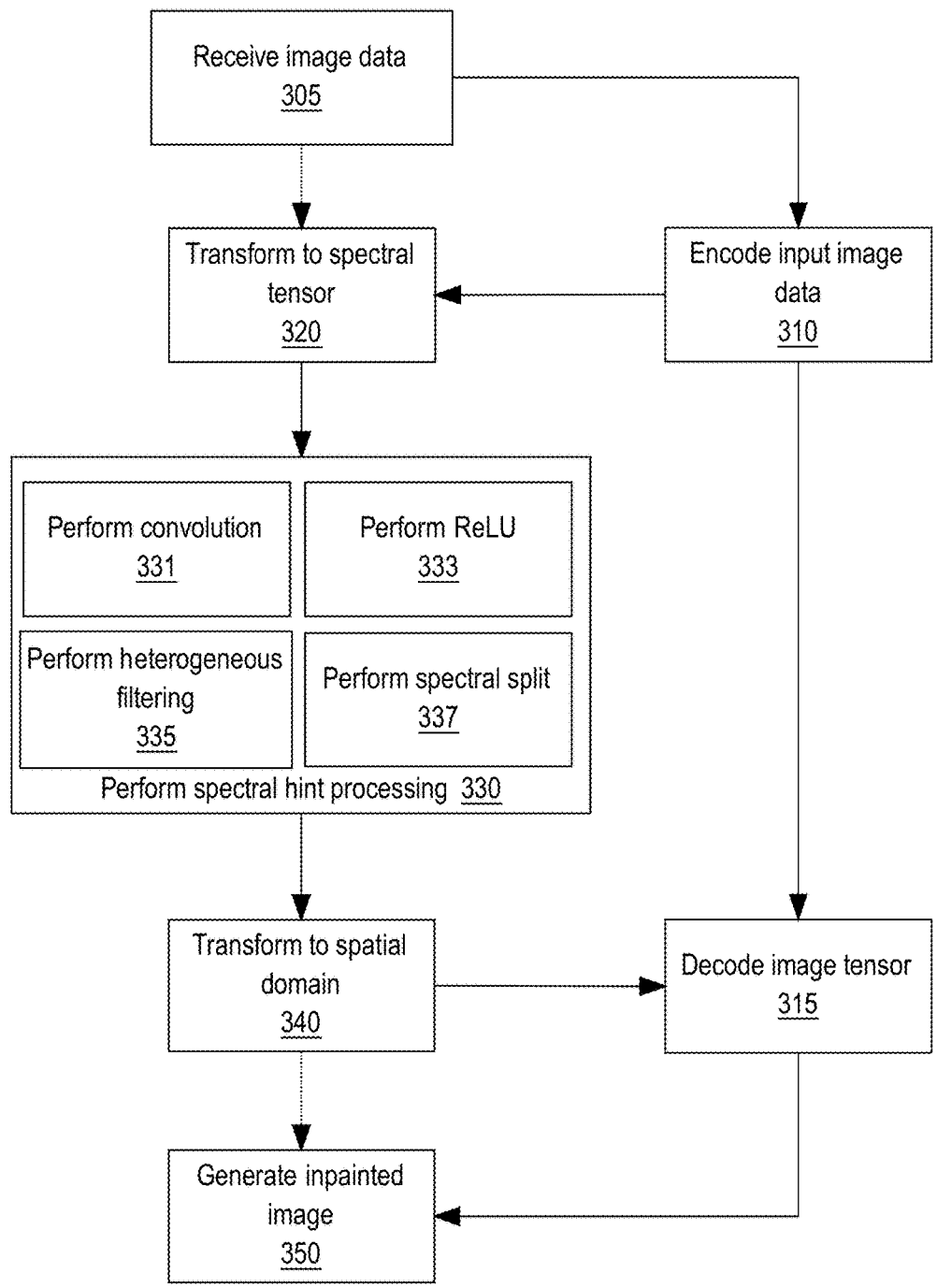
FIG. 3 is a block diagram that depicts a process for inpainting the missing region of image data using spectral hint image processing, in an embodiment.

FIG. 3 is a block diagram that depicts a process for inpainting the missing region of image data using spectral hint image processing, in an embodiment. At step 305, image data, e.g., original image data 100, is received with a mask, missing region mask 105, indicating the unknown region of the image data.

To perform spectral processing, the original image is transformed into the frequency domain. Spectral hint unit 135 takes as an input spectral tensor in the spatial domain, which may be original image data 100 itself or an encoded tensor of the image that is generated by encoder 153. For the latter, at step 310, original image data 100 may be encoded into spatial tensor(s) by encoding layer(s) of encoder 153 as part of CNN 151. An output tensor of any layer of encoder 153 may be used as the input tensor for spectral transform layer 133 at step 320.

At step 320, input spectral tensor 120 is transformed into the frequency domain to yield input spectral tensor 120. The transformation may be performed by spectral transform layer 133 according to the techniques discussed herein. For example, using FFT, original image data 100 of K channels, H height and W width, $\mathbb{R}^{K \times H \times W}$, is transformed to spectral input tensor 120, $\mathbb{C}^{K \times H \times W/2}$, in which the skipped half (W/2) is the reflected complex conjugate.

At step 330, SHU 135 performs spectral processing of input spectral tensor 120. Step 330 includes one or more steps 331-337, which may be performed in any order, in parallel, skipped, or repeated. Accordingly, each step of 331-337 may have a different input spectral tensor: input spectral tensor 120 or another tensor that is an output tensor of another one of the steps if the two steps are performed sequentially.

At step 331, a convolution may be performed on an input spectral tensor. For example, a convolution 1×1 kernel may be performed on each channel matrix of the input spectral tensor. Conv1×1 maps between two complex vector spaces uniformly in the frequency domain, in an embodiment. In such an example, Conv1×1 is a homogeneous operation that treats the complex vector space of the input spectral tensor equally over the frequency domain. FIG. 4A is a graph that depicts the Conv1×1 function applied over the frequency domain, in an embodiment. The weights of the function (i.e., the weight of the 1×1 kernel) may be determined using machine learning techniques.

At step 333, a ReLU function is applied to an input spectral tensor. ReLU function, when applied on the input spectral tensor, performs a transformation as a band-pass filter, in an embodiment. For example, the ReLU function modifies negative components of the spectral vector to zero.

FIG. 4B is a graph that depicts a ReLU function applied over the frequency domain, in an embodiment. ReLU function has zeroed out the spectral tensor values, which have a negative frequency magnitude component. Accordingly, the output spectral tensor has frequency components with positive or zero magnitude component(s). In an embodiment, applying a ReLU function is a necessary step but is not recommended as the last operation for spectral transform because the application completely deactivates a frequency band with no recovery. Accordingly, the function introduces an aliasing effect due to its non-smooth activation.

Heterogenous Filter

At step 335, heterogenous filtering is performed on an input spectral tensor. The input spectral tensor may be input spectral tensor 120 or the output spectral tensor from any of one or more steps 331, 333, 337. In an embodiment, the input spectral tensor of the heterogenous filtering is the output spectral tensor from step 333. And the output spectral tensor of the heterogenous filtering at step 335 may be used as input to spectral split processing at step 337.

The heterogeneous filter may be a smooth varying function, which, when applied to the input spectral tensor, may modify frequency magnitude component(s) to be greater or lower than the original value, or may completely zero out the original frequency. In an embodiment, the heterogeneous filter function is generated by machine learning techniques. Several weights are selected for evenly spaced points in the 2D frequency domain (e.g., along the height and width of the spectral tensor). In an embodiment, the weight values are based on the machine learning algorithm model parameters that are learned using a machine learning algorithm having been trained on a known image data set.

For a point/vector in the frequency domain of the spectral tensor, at which no weight value is determined or exists in the heterogeneous filter, the weight value is determined based on the weight values of other (e.g., neighboring) points/vectors in the frequency domain of the tensor. For example, the weight value at that point may be determined by linearly interpolating the existing weights for other point(s)/vector(s) to that point/vector. Other algorithms may be used to determine the weights based on the known weights, such as various regression techniques, 3×3 bicubic interpolation or Lanczos resampling. The augmented heterogenous filter is thereby expanded to smooth varying frequency magnitude weights that correspond to the points/vectors in the frequency domain.

FIG. 4C depicts a graph of a smooth varying function of a heterogeneous filter in the frequency domain, in an embodiment. The process selects an input vector (e.g., having a dimension of one and length of the channel) from the input spectral tensor at each point of the frequency domain and applies the corresponding weight value of the heterogenous filter that has been determined for that point/vector in the frequency domain. The application of the weight on the frequency vector at the points provides filtering of the spectral tensor. The heterogeneous filter, based on its weight value function, may be a low-pass, band-pass, or high-pass filter.

As another example of the heterogenous filter, a larger grid size, such as 5×3 or 7×4 may be used. However, sufficient improvements in model performance using grid size 3×2, as an example.

Accordingly, performing step 335 on the input spectral tensor generates a heterogeneously filtered output spectral vector of the same dimension and channel length, in an embodiment.

Spectral Split

At step 337, a spectral split is performed on an input spectral tensor. The input spectral tensor may be input spectral tensor 120 or the output spectral tensor from any of one or more steps 331, 333, 335. In an embodiment, at step 337, the performance of spectral split generates output spectral tensors 123 of SHU 135.

Since the input spectral tensor is in the frequency domain, the input spectral tensor may be split along the height and/or width to carve out a sub-tensor corresponding to the (2D) frequency band. The frequency bands for the sub-tensor may be pre-configured or determined by a machine-learning algorithm. For example, the machine learning algorithm may determine the actual number of levels, which identify the portions of bands, the input spectral is split into.

In an embodiment, the input spectral tensor may losslessly be divided into sub-tensor(s) because of a fundamental property of the Fourier Transform $\mathcal{F}$ is linearity, in which the FT of the addition of the functions $f_1$ and $f_2$ equals the addition of the individual FTs of $f_1$ and $f_2$ (see Eq. 1). Utilizing the property mentioned above, any spectral signal $\hat{x}=\mathcal{F}(x)$ may be split into several sub-signals (sub-tensors) $\hat{x}_i$, i∈{1 . . . n}. As long as $\Sigma_i \hat{x}_i = \hat{x}$, no information loss on $x=\Sigma_i \mathcal{F}^{-1}(\hat{x}_i)$ is expected, and this property holds for FFT on discrete tensors. For convenience, the same set of symbols $\hat{x}$, $\hat{x}_i$ representing spectral tensors is used.

FIG. 4D is a graphic illustration that depicts a Gaussian split, in an embodiment. For a Gaussian Split, a spectral split may be extended by applying a Gaussian mask on each split level for better anti-aliasing, in an embodiment. FIG. 4D depicts an example of decomposition, which automatically segregates signals based on their frequency bands. For example, a two-level split is formulated in Eq. 1 and 2, which transfers all low-frequency values from the large tensor to the small one.

$$\hat{x} \in \mathbb{C}^{H \times \frac{W}{2}} \xleftrightarrow{\text{split}} \left(\hat{x}_1 \in \mathbb{C}^{H \times \frac{W}{2}}, \hat{x}_2 \in \mathbb{C}^{\frac{H}{2} \times \frac{W}{4}}\right) \quad (1)$$

$$\hat{x}_{1[i,j]} = \begin{cases} \hat{x}_{[i,j]} & (i,j) \notin \left(\frac{H}{4} \ldots \frac{3H}{4}, 0 \ldots \frac{W}{4}\right) \\ 0 & (i,j) \in \left(\frac{H}{4} \ldots \frac{3H}{4}, 0 \ldots \frac{W}{4}\right) \end{cases} \text{(Vanilla)} \quad (2)$$

$$\hat{x}_2 = \hat{x}_{\left[\frac{H}{4} \ldots \frac{3H}{4}, 0 \ldots \frac{W}{4}\right]}$$

In an embodiment, Gaussian map(s) are applied to the split-generated sub-tensors. Each split-generated sub-tensor's frequency components are smoothed with Gaussian weight maps $\mathcal{N}$ to minimize the aliasing effect. (see Eq. 3). In an embodiment, the center of $\mathcal{N}$ is at (H/2, 0), and the standard deviation a is proportional to the corresponding resolution of the image.

$$\hat{x}_{1[i,j]} = \begin{cases} \hat{x}_{[i,j]} & (i,j) \notin \left(\frac{H}{4} \ldots \frac{3H}{4}, 0 \ldots \frac{W}{4}\right) \\ \hat{x}_{[i,j]} \times (1 - \mathcal{N}_{[i,j]}) & (i,j) \in \left(\frac{H}{4} \ldots \frac{3H}{4}, 0 \ldots \frac{W}{4}\right) \end{cases} \text{(Gaussian)}$$

$$\hat{x}_2 = \hat{x}_{\left[\frac{H}{4} \ldots \frac{3H}{4}, 0 \ldots \frac{W}{4}\right]} \times \mathcal{N}_{\left[\frac{H}{4} \ldots \frac{3H}{4}, 0 \ldots \frac{W}{4}\right]}$$

Since the Fourier transform of a Gaussian function is another Gaussian function, applying Gaussian maps in the frequency domain is equivalent to applying a Gaussian blur filter on the spatial domain that may be performed before downsampling. The multi-level Gaussi (3) Split may serve as the difference of Gaussian (DoG) in the spatial domain.

Accordingly, the determined number of levels for splitting the input spectral tensor and the corresponding application of the Gaussian map to each level's sub-tensor causes the same effect as the multiple Gaussian blur filters application in the spatial domain of the input spectral tensor. This process generates in the final image the edges and details that are present in the original image and, in some cases, highlighted more than in the original image. The generation of these features by the Gaussian split function produces more accurate inpainting of the image.

Inverse Transform to Spatial Domain

Continuing with FIG. 3, at step 340, the output spectral tensor(s), output spectral tensor(s) 123, are inverse transformed to corresponding output spatial tensor(s), output spatial tensor(s) 127. The process (e.g., spatial transform layer 136) applies the spatial transform function, which is the inverse of the function applied at step 320. For example, if at step 320, an FFT function is applied on input image tensor 110, then, at step 340, an iFFT is applied on output spectral tensor(s) 123 to generate output spatial tensor(s) 127.

In an embodiment, in which split step 337 is not performed, a single input tensor is provided for step 340. Accordingly, a single output spatial tensor 127 is generated by the inverse transform. At step 315, the single output spatial tensor 127 is then merged with the tensor at the layer of decoder 157 that corresponds to the layer of encoder 153 from which input image tensor 110 was obtained. Alternatively, if the input tensor for step 320 is original image data 100, then, after transforming single output spectral tensor 123 at step 340, the process proceeds to step 350 to generate the inpainted image data.

In an alternative embodiment, the process, at step 337, splits the spectral tensor into multiple sub-tensors. As part of the split, different dimension tensors may be generated. In an embodiment, the largest dimension size spectral band sub-tensor is generated for the higher magnitude frequency range and the smallest dimension size spectral band tensor is generated for the lower magnitude frequency range.

The different size sub-tensors may be merged with tensor(s) generated in a generative model such as CNN 151. Because the generative model utilizes the progressive structure in which low-resolution features (low frequency) are gradually elaborated into high-resolution (high frequency) features, the process matches each sub-tensor to the corresponding level of features in the pipeline. Since the smaller dimension layers in the decoder evaluate the low-frequency information, and the smaller dimension spatial sub-tensor corresponds to the low-frequency magnitude band, the combination of such low-frequency information may more accurately generate the missing region. Similarly, since the greater dimension layers in the decoder process the higher-frequency information and the greater dimension spatial sub-tensor corresponds to the higher-frequency magnitude band, the combination of the high-frequency information may more accurately generate the missing region of the spatial tensor of the layer.

To achieve high accuracy low-level and high-level detail in inpainting of the missing region, at step 340, the high-frequency spectral band sub-tensor generates a larger dimension spatial sub-tensor, and the low-frequency spectral band tensor generates a smaller dimension spatial sub-tensor, in an embodiment. A downsampling or upsampling may be performed to obtain the appropriate dimension for the spatial sub-tensor to merge with the appropriate dimension layer tensor. Accordingly, the smaller dimension spatial sub-tensor is to be merged with the corresponding smaller dimension layer in the decoder layers, and the greater dimension spatial sub-tensor is to be merged with the higher dimension layer in the decoder layers.

At step 315, the process merges the spectral (sub) tensor with a spectral tensor of the corresponding layer in decoder 157. The merging operation may be performed by tensor addition (adding corresponding channel matrices together) or concatenation (expanding the number of channels), other merging operations are also envisioned by the techniques. The tensor of the layer in decoder 157 may be the input tensor of the layer or the output tensor of the layer of the corresponding dimension to the spatial sub-tensor.

At step 350, the process completes propagating the merged image spatial tensor through the layers of decoder 157, thereby generating an output image tensor, output image data 160, that has the same dimension and channels as the original image data 100. Inpainted image data 170 is generated by augmenting original image data 100 with the region of pixel data from output image data 160 that corresponds to an unknown region of missing region mask 105. Thus, output image data 160 is the source of pixel data for the unknown region of missing region mask 105, which, when merged with pixel data of original image data 100 for the known region, generates inpainted image data 170 at step 350.

SH-GAN

Figure 5:
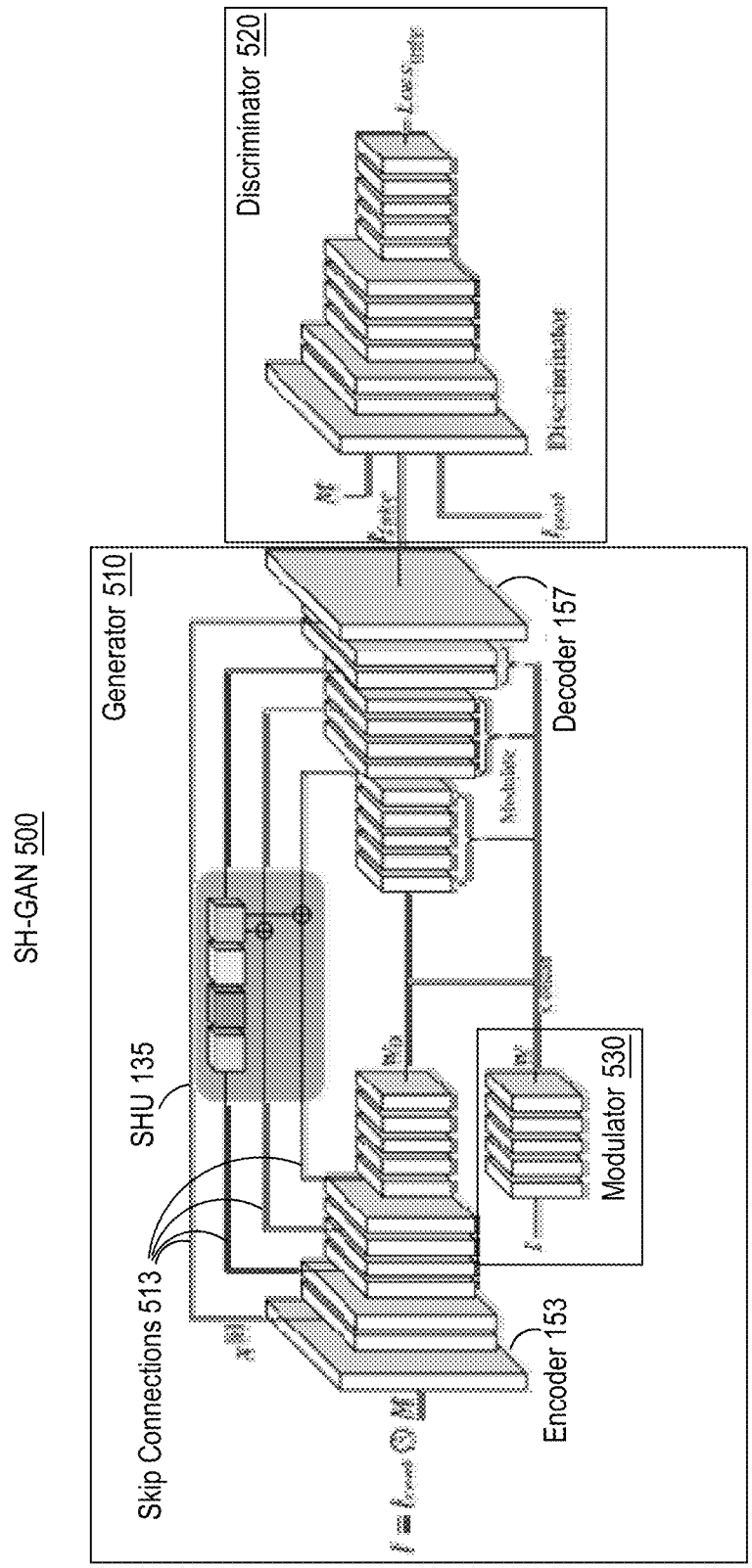
FIG. 5 is a block diagram that depicts a GAN with co-modulation and SHU, in an embodiment.

In an embodiment, SHU 135 may be incorporated into a generative adversarial network (GAN) for image inpainting. FIG. 5 is a block diagram that depicts a GAN with co-modulation and SHU, in an embodiment. Spectral Hint GAN (SH-GAN) 500 includes generator 510 and discriminator 520. While training SH-GAN 500, generator 510 takes a real input image from which a mask region is removed to generate an input image necessary for inpainting. Accordingly, SH-GAN 500 generates $I_{fake}$ from a masked image $I=I_{real} \odot M$, where $I_{real}$ is the ground-truth image, and M is the mask, in which the known pixels have a value of 1, and the unknown pixels are represented with zeros. The neural network of generator 510 is trained to generate $I_{fake}$ as close as possible to $I_{real}$.

On the other hand, discriminator 520 is a neural network that predicts whether the image is real or fake. Accordingly, discriminator 520 is trained by taking the $I_{fake}$ generated by generator 510, $I_{real}$ and M the mask to detect the fake image as accurately as possible. Discriminator 520 is executed during the training and may affect the trainable parameter(s) of generator 510, such as the weights of a heterogenous filter of SHU 135.

Additionally, SH-GAN 500 may include modulator 530 to perform co-modulation GAN generation of pixel data. Once encoder 153 of SH-GAN 500 generates an encoded tensor of the image, the tensor is concatenated and modulated with a random vector-generated tensor of modulator 530, in an embodiment.

In an embodiment, SH-GAN 500 implements skip connections 513 such that an output tensor of a layer in encoder 153 is directly fed into a corresponding layer in decoder 157, skipping through the next layers of encoder 153 and decoder 157. The corresponding layer of decoder 157 has the same dimensions and channels as the tensor generated by encoder 15. The output tensor is merged with (added to or concatenated) the output/input tensor of the corresponding layer of decoder 157.

In an embodiment, SHU 135 receives an input spatial tensor on one or more skip connections 513. SHU 135 performs the spectral processing on the input spatial tensor according to the techniques described herein and generates output tensor(s). The skip connection(s) 513 are also used for integrating the generated output tensor with tensor(s) at the decoder layer(s). In the embodiment in which SHU 135 performs a spectral split (e.g., Gaussian split), multiple spatial tensors are generated by SHU 135. Accordingly, SHU 135 may provide multiple output tensors to multiple layers of decoder 157 through multiple skip connections 513 (as depicted in FIG. 5).

Example Results

Tables 1 and 2 compare the performances of the techniques described herein (e.g., SH-GAN) with other techniques performed on a high-quality image dataset of human faces (FFHQ) and an image dataset of unique scenes (Places2). Among the four metrics, FID/LPIPS gauge perception quality and PSNR/SSIM gauge pixel accuracy. These metrics reveal image quality in a different way, so the respective metric values may be different. As a result of the experiment process, SH-GAN reaches 4.3459 and 7.5036 on FFHQ and Places2 datasets, respectively, for the resolution 256 and 3.4134 and 7.0277 for the resolution 512. SH-GAN surpasses all other approaches in terms of FID and, thus, offers a considerable improvement.

TABLE 1

The inpainting performance example at resolution 256 with free-form masks.

| Method | FFHQ 256 | | | | Places2 256 | | | |
| --- | --- | --- | --- | --- | --- | --- | --- | --- |
| | FID(↓) | LPIPS(↓) | PSNR(↑) | SSIM(↑) | FID(↓) | LPIPS(↓) | PSNR(↑) | SSIM(↑) |
| CoModGan (small) | 5.0184 | 0.2579 | 16.31 | 0.5892 | 9.5159 | 0.3995 | 14.49 | 0.4914 |
| CoModGan (official) | 4.7755 | 0.2568 | 16.24 | 0.5913 | 9.3621 | 0.3990 | 14.50 | 0.4923 |
| LaMa | 32.7252 | 0.2590 | 17.58 | 0.6277 | 23.7409 | 0.3679 | 16.58 | 0.5448 |
| DeepFillV2 | 50.9339 | 0.3204 | 16.11 | 0.5569 | 46.2012 | 0.4166 | 14.97 | 0.4913 |
| CR-Fill | — | — | — | — | 40.9690 | 0.3957 | 15.28 | 0.4925 |
| Onion-Conv | — | — | — | — | 42.4625 | 0.4360 | 15.03 | 0.5046 |
| MADF | 33.6207 | 0.2800 | 17.54 | 0.6279 | 66.2659 | 0.3889 | 16.61 | 0.5360 |
| AOT-GAN | 73.7962 | 0.4270 | 15.60 | 0.5956 | 90.6184 | 0.5139 | 14.87 | 0.4790 |
| (ours-small) | 4.8225 | 0.2558 | 16.36 | 0.5891 | 8.3078 | 0.3969 | 14.50 | 0.4918 |
| (ours-regular) | 4.3459 | 0.2542 | 16.37 | 0.5911 | 7.5036 | 0.3940 | 14.58 | 0.4958 |

TABLE 2

The inpainting performance example at resolution 512 with free-form masks.

| Method | FFHQ 512 | | | | Places2 512 | | | |
|---|---|---|---|---|---|---|---|---|
| | FID($\downarrow$) | LPIPS($\downarrow$) | PSNR($\uparrow$) | SSIM($\uparrow$) | FID($\downarrow$) | LPIPS($\downarrow$) | PSNR($\uparrow$) | SSIM($\uparrow$) |
| CoModGan (small) | 3.9420 | 0.2497 | 18.38 | 0.6911 | 8.8390 | 0.3464 | 15.96 | 0.5925 |
| CoModGan (official) | 3.6996 | 0.2469 | 18.46 | 0.6956 | 8.1028 | 0.3445 | 15.96 | 0.5930 |
| LaMa | 32.0816 | 0.3127 | 18.87 | 0.7289 | 12.6721 | 0.3158 | 17.12 | 0.6521 |
| DeepFillV2 | 52.9983 | 0.3908 | 17.27 | 0.6889 | 29.7345 | 0.3802 | 15.91 | 0.5953 |
| CR-Fill | — | — | — | — | 26.6398 | 0.3593 | 16.52 | 0.6038 |
| Onion-Conv | — | — | — | — | 25.7480 | 0.3999 | 15.02 | 0.6061 |
| MADF | 17.1962 | 0.2688 | 19.62 | 0.7196 | 29.4928 | 0.3299 | 17.77 | 0.6239 |
| AOT-GAN | 36.1344 | 0.3403 | 18.14 | 0.7131 | 46.7640 | 0.3976 | 16.84 | 0.6029 |
| (ours-small) | 3.7460 | 0.2491 | 18.36 | 0.6897 | 7.6122 | 0.3455 | 15.95 | 0.5926 |
| (ours-regular) | 3.4134 | 0.2447 | 18.43 | 0.6936 | 7.0277 | 0.3386 | 16.03 | 0.5973 |

Figure 6:
FIG. 6 depicts example demo images for qualitative comparison, according to one or more embodiments.

In addition to the free-form mask experiments, the example process also made similar experiments using the LaMa-style narrow and wide masks. Tables 3 and 4 list the detailed performances from which the effectiveness of SH-GAN is evident. FIG. 6 depicts example demo images for qualitative comparison, according to one or more embodiments.

The techniques described herein improve the prior challenges, such as pattern unawareness, blurry texture, and structure distortion. To demonstrate the improvement, an ablation study is conducted using the DTD dataset, in which the example process trained several models and excluded SHU, Heterogeneous Filter, or Gaussian Split, respectively. The experiments are focused on the DTD dataset because

TABLE 3

The performance example on resolution 256 with narrow and wide masks.

| Method | FFHQ 256 | | | | Places2 256 | | | |
|---|---|---|---|---|---|---|---|---|
| | narrow | | wide | | narrow | | wide | |
| | FID($\downarrow$) | LPIPS($\downarrow$) | FID($\downarrow$) | LPIPS($\downarrow$) | FID($\downarrow$) | LPIPS($\downarrow$) | FID($\downarrow$) | LPIPS($\downarrow$) |
| CoModGan (small) | 2.0327 | 0.0430 | 2.5680 | 0.1235 | 1.7972 | 0.0880 | 3.4491 | 0.2022 |
| CoModGan (official) | 1.7082 | 0.0411 | 2.4859 | 0.1224 | 1.5214 | 0.0857 | 3.3955 | 0.2016 |
| LaMa | 4.6266 | 0.0418 | 8.5166 | 0.1169 | 11.4755 | 0.0746 | 12.6746 | 0.1792 |
| DeepFillV2 | 8.5445 | 0.0673 | 14.7537 | 0.1531 | 15.0309 | 0.0980 | 20.6116 | 0.2160 |
| CR-Fill | — | — | — | — | 12.5929 | 0.0935 | 18.1343 | 0.2036 |
| Onion-Conv | — | — | — | — | 15.0021 | 0.1107 | 18.2985 | 0.2239 |
| MADF | 1.5619 | 0.0312 | 7.3928 | 0.1257 | 10.4441 | 0.0730 | 20.0603 | 0.2023 |
| AOT-GAN | 2.1126 | 0.0355 | 15.6649 | 0.1576 | 9.9570 | 0.0843 | 26.5505 | 0.2353 |
| (ours-small) | 2.0790 | 0.0437 | 2.5108 | 0.1222 | 1.5607 | 0.0867 | 3.0663 | 0.2000 |
| (ours-regular) | 1.6847 | 0.0414 | 2.3336 | 0.1214 | 1.3084 | 0.0832 | 2.7853 | 0.1982 |

TABLE 4

The performance example on resolution 512 with narrow and wide masks.

| Method | FFHQ 512 | | | | Places2 512 | | | |
|---|---|---|---|---|---|---|---|---|
| | narrow | | wide | | narrow | | wide | |
| | FID($\downarrow$) | LPIPS($\downarrow$) | FID($\downarrow$) | LPIPS($\downarrow$) | FID($\downarrow$) | LPIPS($\downarrow$) | FID($\downarrow$) | LPIPS($\downarrow$) |
| CoModGan (small) | 1.4628 | 0.0585 | 2.8030 | 0.1936 | 1.2474 | 0.0998 | 4.8398 | 0.2574 |
| CoModGan (official) | 1.2668 | 0.0546 | 2.7336 | 0.1925 | 1.1009 | 0.0964 | 4.5227 | 0.2566 |
| LaMa | 2.3060 | 0.0608 | 20.0821 | 0.2414 | 1.2551 | 0.0884 | 7.6624 | 0.2425 |
| DeepFillV2 | 6.0210 | 0.0989 | 32.6507 | 0.2943 | 2.0743 | 0.1003 | 18.3419 | 0.2871 |
| CR-Fill | — | — | — | — | 1.7619 | 0.0916 | 14.8824 | 0.2675 |
| Onion-Conv | — | — | — | — | 3.1910 | 0.1149 | 14.0048 | 0.2999 |
| MADF | 1.4295 | 0.0544 | 11.2990 | 0.2041 | 1.0556 | 0.0751 | 18.4953 | 0.2532 |
| AOT-GAN | 1.7366 | 0.0516 | 23.6286 | 0.2458 | 1.3204 | 0.0808 | 28.4871 | 0.2950 |
| (ours-small) | 1.4070 | 0.0592 | 2.7658 | 0.1934 | 1.1583 | 0.0993 | 4.4051 | 0.2570 |
| (ours-regular) | 1.2053 | 0.0550 | 2.6009 | 0.1901 | 0.9307 | 0.0916 | 3.9755 | 0.2532 | texture images are highly structured images that could make obvious cases for comparison.

TABLE 5

The ablation study on DTD with SHU, Heterogeneous Filtering (HF), and Gaussian Split (GS) removed, respectively.

| Models | SHU | HF | GS | FID($\downarrow$) | LPIPS($\downarrow$) | PSNR($\uparrow$) | SSIM($\uparrow$) |
|---|---|---|---|---|---|---|---|
| baseline | | | | 51.9289 | 0.3628 | 16.37 | 0.4537 |
| ours-no_HF | ✓ | | ✓ | 50.4074 | 0.3614 | 16.42 | 0.4517 |
| ours-no_GS | ✓ | ✓ | | 50.0634 | 0.3573 | 16.50 | 0.4569 |
| ours | ✓ | ✓ | ✓ | 48.5814 | 0.3519 | 16.59 | 0.4634 |

Table 5 recites results demonstrating that the model performed Frechet inception distance (HD), 48.58, is lower than the model without Gaussian Split (i.e., for example—no_GS) by 1.48, is lower than the model without Heterogeneous Filtering (i.e., for example—no_HF) by 1.83, and is lower than the baseline (i.e., CoModGAN) by 3.35. The other metrics for the accuracy of inpainting (LPIPS, PSNR, and SSIM scores) agree with the FID score.

Figure 7:
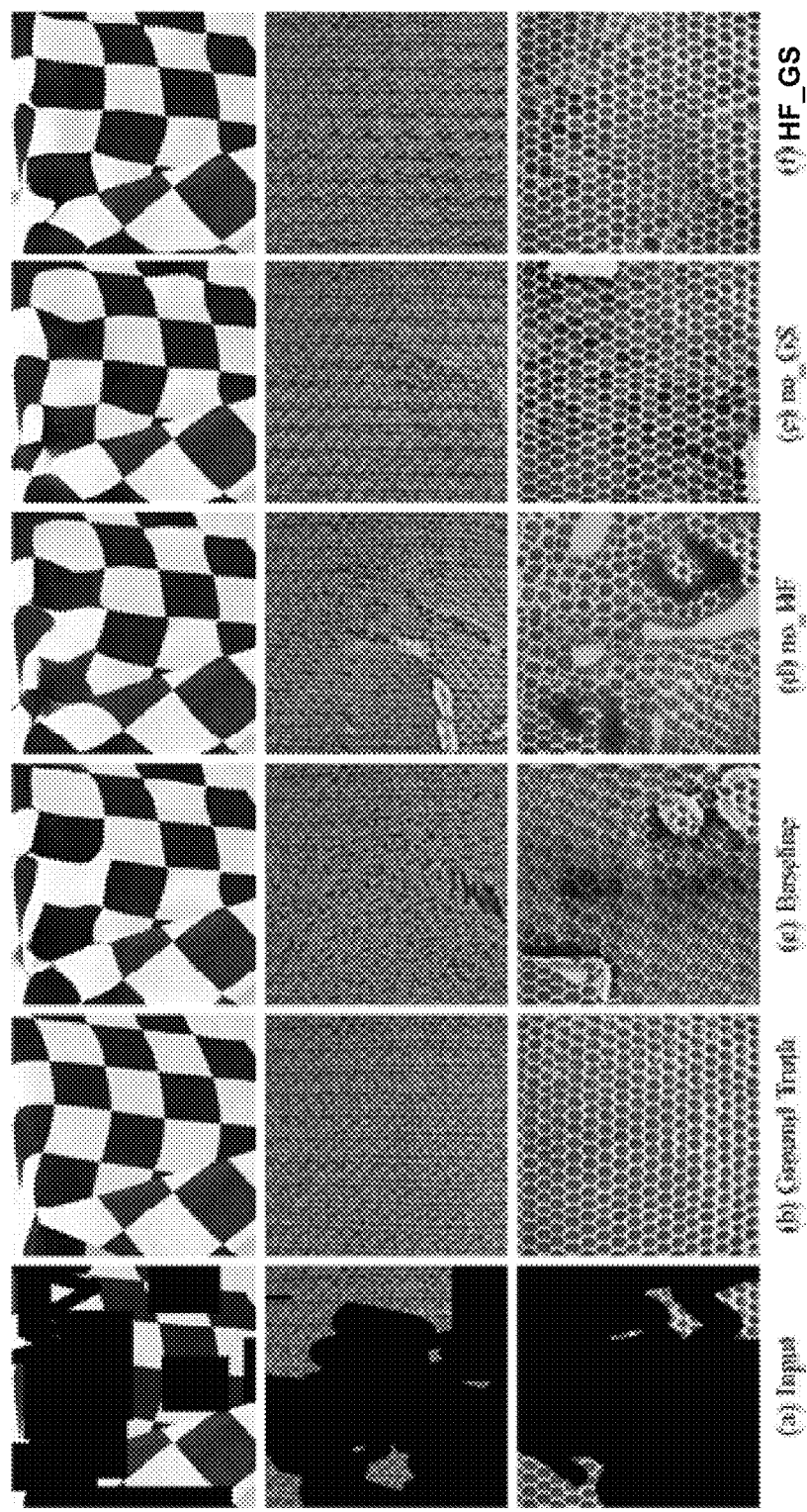
FIG. 7 depicts images for the qualitative comparison of various settings in the ablation study, in an embodiment.

FIG. 7 depicts images for the qualitative comparison of various settings in the ablation study, in an embodiment. FIG. 7 demonstrates that the techniques described herein generate sharp and robust patterns even when the mask coverage is large. The HeFilter is very helpful in cases with complex structures, and the Gaussian Split helps to remove the aliasing effect to make the pattern sharper.

In the second experiment, the example process extracts the skip feature maps $x^{([i])}$ generated by the encoder and the intermediate feature maps $y^{([i])}$ generated by the synthesis blocks, $i \in \{16, 32, 64\}$. The example process computes the 2-norm of each feature map along the channel axis. To make clear comparisons, the SHU is only connected on resolution 32 without splitting in this experiment.

Software Overview

Figure 8:
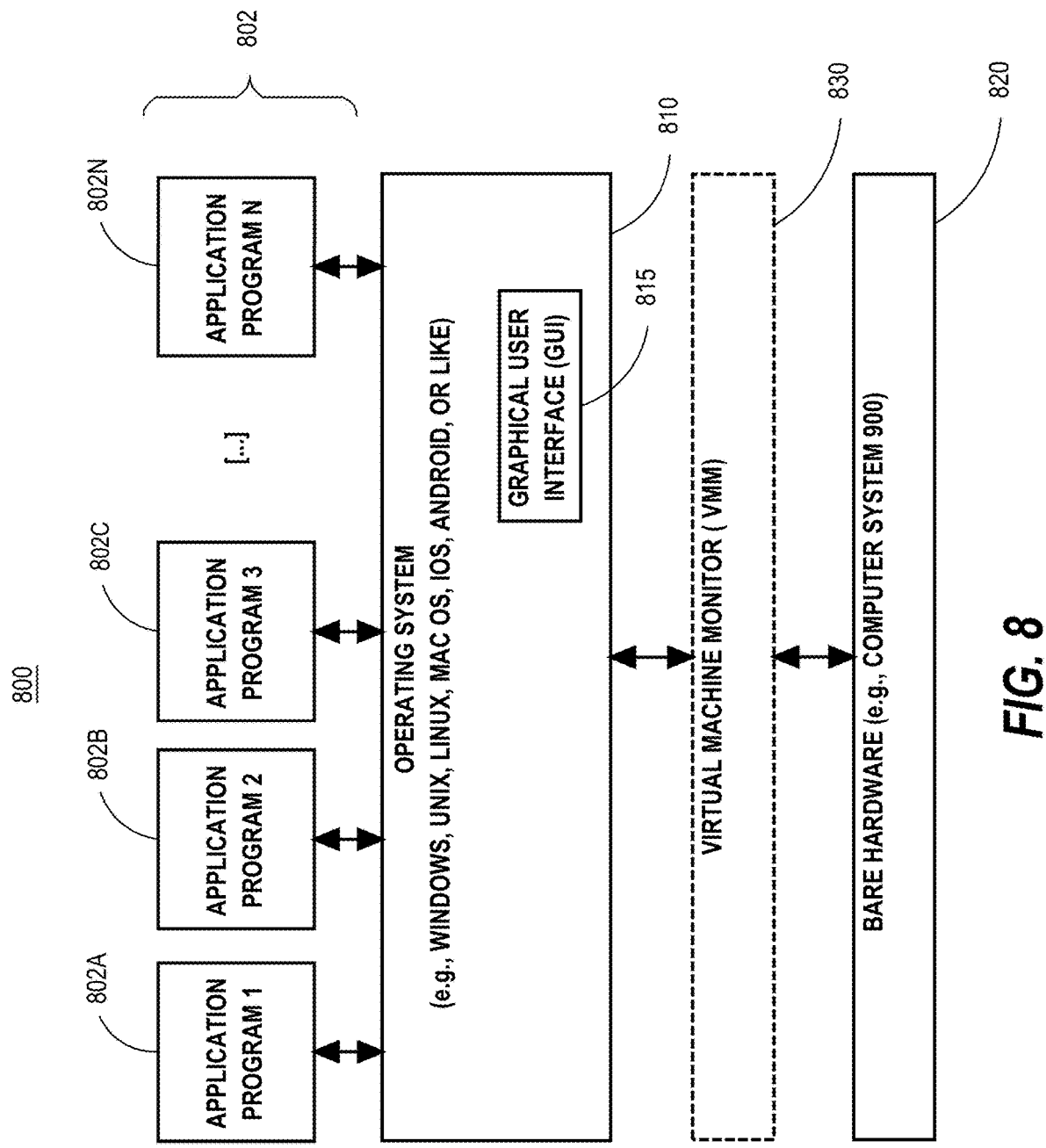
FIG. 8 is a block diagram of a basic software system, in one or more embodiments.
Figure 9:
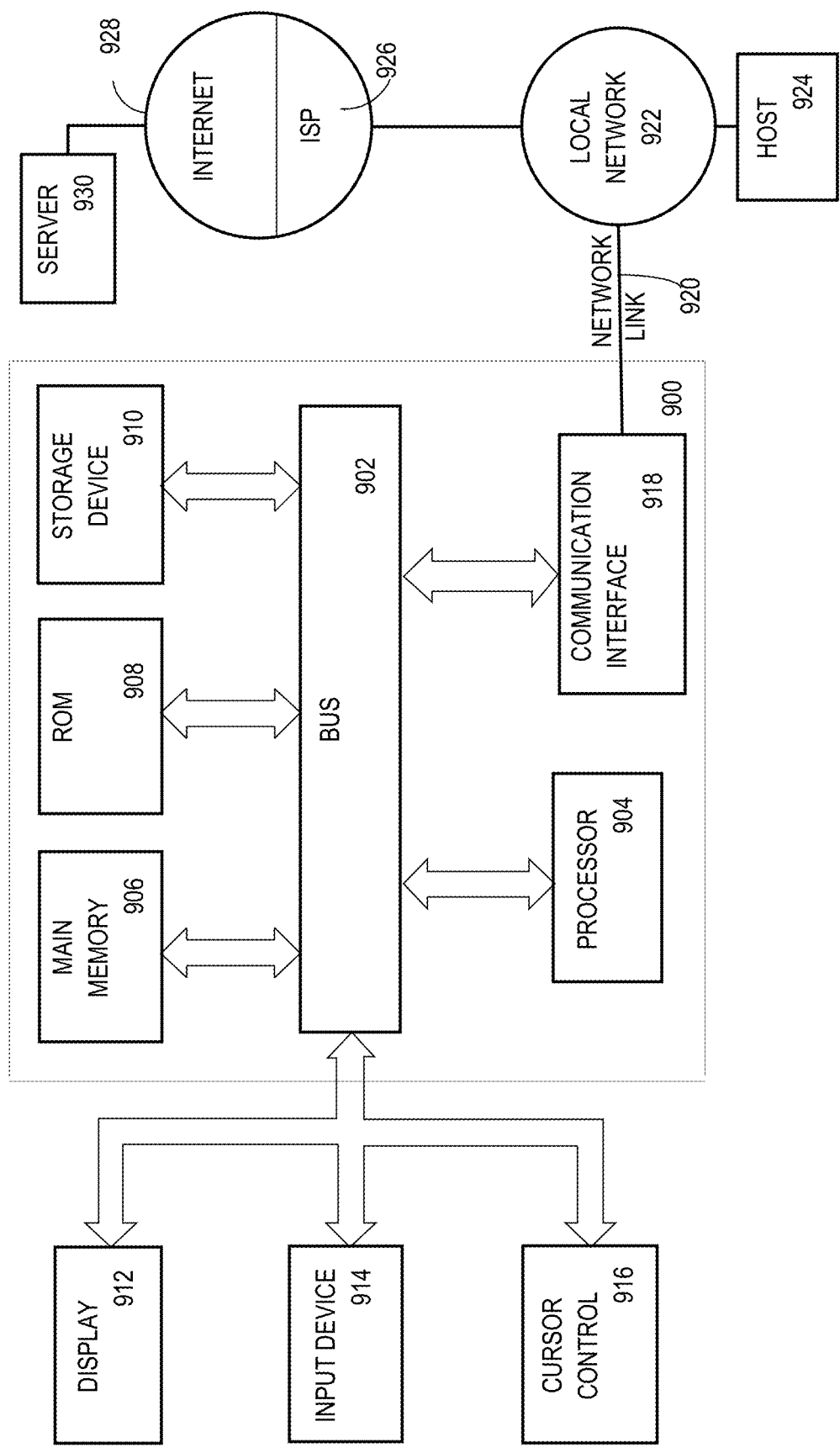
FIG. 9 is a block diagram that illustrates a computer system upon which an embodiment of the invention may be implemented.

FIG. 8 is a block diagram of a basic software system 800 that may be employed for controlling the operation of computing system 900 of FIG. 9. Software system 800 and its components, including their connections, relationships, and functions, are meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 900. Software system 800, which may be stored in system memory (RAM) 906 and on fixed storage (e.g., hard disk or flash memory) 910, includes a kernel or operating system (OS) 810.

The OS 810 manages low-level aspects of computer operation, including managing execution of processes, memory allocation, file input and output (I/O), and device I/O. One or more application programs represented as 802A, 802B, 802C . . . 802N, may be "loaded" (e.g., transferred from fixed storage 910 into memory 906) for execution by the system 800. The applications or other software intended for use on computer system 900 may also be stored as a set of downloadable computer-executable instructions, for example, for downloading and installation from an Internet location (e.g., a Web server, an app store, or another online service).

Software system 800 includes a graphical user interface (GUI) 815, for receiving user commands and data in a graphical (e.g., "point-and-click" or "touch gesture") fashion. These inputs, in turn, may be acted upon by system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 904) of computer system 900. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 900.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 900 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but shares access to the memory allotted to the process. The memory is used to store the content of processors between the allotments when the thread is not running. The term thread may also be used to refer to a computer system process in multiple threads that are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by or within a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department to instead be delivered as service layers within a cloud environment for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). In a cloud computing environment, there is no insight into the application or the application data. For a disconnection-requiring planned operation, with techniques described herein, it is possible to release and then to later rebalance sessions with no disruption to applications.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general-purpose microprocessor.

Computer system 900 also includes a main memory 906, such as a random access memory (RAM) or another dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read-only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal, and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926, in turn, provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   obtaining an input image tensor of image data, the input image tensor comprising a known region and a missing region, wherein the known region comprises a plurality of known pixel data units and the missing region comprises a plurality of unknown pixel data units;
   transforming the input image tensor of the image data into a spectral tensor of the image data wherein one or more of: row values or column values, of each matrix in the input image tensor are provided as a sequence of pixel data values in a spatial domain for which corresponding frequency values are determined in a frequency domain;
   modifying the spectral tensor of the image data to generate a filtered spectral tensor of the image data at least by applying a filter, having a plurality of weights, on the spectral tensor;

wherein one or more weights of the plurality of weights of the filter are determined at least in part by a machine learning algorithm;

generating output image data, at least in part, by transforming the filtered spectral tensor into the spatial domain;

using the known region of the input image tensor and based, at least in part, on a region, of the output image data, that corresponds to the missing region of the input image tensor, generating a final output image.

2. The method of claim 1, wherein trainable parameters of the machine learning algorithm include the one or more weights.

3. The method of claim 1 further comprising performing training of the machine learning algorithm having one or more trainable parameters corresponding to the one or more weights thereby determining values for the one or more weights.

4. The method of claim 1, further comprising:
generating a filtering function of the filter at least by:
identifying a subset of frequency points in the frequency domain,
determining a corresponding weight, of the one or more weights, for each frequency point in the subset of frequency points in the frequency domain, to modify a corresponding frequency value for said each frequency point by the corresponding weight,
based at least in part on the one or more weights for the subset of points in the frequency domain, determining the filtering function of weight values in the frequency domain.

5. The method of claim 4, wherein the filtering function is a smooth varying mapping function.

6. The method of claim 4, wherein determining the filtered function of weight values in the frequency domain comprises performing bilinear interpolation based on the one or more weights for the subset of frequency points in the frequency domain and thereby determining other one or more weights that correspond to one or more other frequency points in the frequency domain that are not in the subset of frequency points.

7. A computer-implemented method comprising:
obtaining an input image tensor of image data, the input image tensor comprising a known region and a missing region, wherein the known region comprises a plurality of known pixel data units and the missing region comprises a plurality of unknown pixel data units;
transforming the input image tensor of the image data into a spectral tensor of the image data wherein one or more of: row values or column values, of each matrix in the input image tensor are provided as a sequence of pixel data values in a spatial domain for which corresponding frequency values are determined in a frequency domain;
performing a split of the spectral tensor thereby generating a plurality of spectral sub-tensors, each spectral sub-tensor corresponding to a particular frequency band
applying a gaussian map on said each spectral sub-tensor to generate a plurality of gaussian split spectral sub-tensors;
performing an inverse transform of the plurality of gaussian split spectral sub-tensors from the frequency domain to the spatial domain thereby generating a plurality of spatial sub-tensors;
based, at least in part, on the plurality of spatial sub-tensors, generating output image data;

using the known region of the input image tensor and based, at least in part, on a region, of the output image data, that corresponds to the missing region of the input image tensor, generating a final output image.

8. The method of claim 7, wherein the plurality of spectral sub-tensors correspond to a plurality of frequency bands that includes the particular frequency band, and wherein the plurality of frequency bands includes at least one low frequency band and at least one high-frequency band.

9. The method of claim 8,
wherein a low-frequency split spectral sub-tensor of the plurality of spectral sub-tensors corresponds to the at least one low frequency band, a high-frequency split spectral sub-tensor of split spectral sub-tensors corresponds to the at least one high-frequency band;
wherein performing the inverse transform of the plurality of the split spectral sub-tensors from the frequency domain to the spatial domain includes generating a low-detail spatial sub-tensor from the low-frequency split spectral sub-tensor of the plurality of spectral sub-tensors, and generating a high-detail spatial sub-tensor from the high-frequency spectral sub-tensor of the plurality of split spectral sub-tensors;
merging the low-detail spatial sub-tensor with a tensor of a smaller dimension layer of a decoder, and merging the high-detail spatial sub-tensor with a tensor of a greater dimension layer of the decoder, the decoder generating the output image data.

10. The method of claim 7, wherein a size of the gaussian map is based on resolution of the image data or calculated as a parameter of a machine learning model.

11. A system comprising one or more processors and one or more storage media storing a set of instructions, which, when executed by the one or more processors, causes:
obtaining an input image tensor of an image data, the input image tensor comprising a known region and a missing region, wherein the known region comprises a plurality of known pixel data units and the missing region comprises a plurality of unknown pixel data units;
transforming the input image tensor of the image data into a spectral tensor of the image data wherein one or more of: row values or column values, of each matrix in the input image tensor are provided as a sequence of pixel data values in a spatial domain for which corresponding frequency values are determined in a frequency domain;
modifying the spectral tensor of the image data to generate a filtered spectral tensor of the image data at least by applying a filter, having a plurality of weights, on the spectral tensor;
wherein one or more weights of the plurality of weights of the filter are determined at least in part by a machine learning algorithm;
generating output image data, at least in part, by transforming the filtered spectral tensor into the spatial domain;
using the known region of the input image tensor and based, at least in part, on a region, of the output image data, that corresponds to the missing region of the input image tensor, generating a final output image.

12. The system of claim 11, wherein trainable parameters of the machine learning algorithm include the one or more weights.

13. The system of claim 11, wherein the set of instructions includes instructions, which, when executed by the one or more processors, cause performing training of the machine learning algorithm having one or more trainable parameters corresponding to the one or more weights thereby determining values for the one or more weights.

14. The system of claim 11, wherein the set of instructions includes instructions, which, when executed by the one or more processors, cause:
generating a filtering function of the filter at least by:
identifying a subset of frequency points in the frequency domain,
determining a corresponding weight, of the one or more weights, for each frequency point in the subset of frequency points in the frequency domain, to modify a corresponding frequency value for said each frequency point by the corresponding weight,
based at least in part on the one or more weights for the subset of points in the frequency domain, determining the filtering function of weight values in the frequency domain.

15. The system of claim 14, wherein the filtering function is a smooth varying mapping function.

16. The system of claim 14, wherein determining the filtered function of weight values in the frequency domain comprises performing bilinear interpolation based on the one or more weights for the subset of frequency points in the frequency domain and thereby determining other one or more weights that correspond to one or more other frequency points in the frequency domain that are not in the subset of frequency points.

17. A system comprising one or more processors and one or more storage media storing a set of instructions, which, when executed by the one or more processors, causes:
obtaining an input image tensor of image data, the input image tensor comprising a known region and a missing region, wherein the known region comprises a plurality of known pixel data units and the missing region comprises a plurality of unknown pixel data units;
transforming the input image tensor of the image data into a spectral tensor of the image data wherein one or more of: row values or column values, of each matrix in the input image tensor are provided as a sequence of pixel data values in a spatial domain for which corresponding frequency values are determined in a frequency domain;
performing a split of the spectral tensor thereby generating a plurality of spectral sub-tensors, each spectral sub-tensor corresponding to a particular frequency band
applying a gaussian map on said each spectral sub-tensor to generate a plurality of gaussian split spectral sub-tensors;
performing an inverse transform of the plurality of gaussian split spectral sub-tensors from the frequency domain to the spatial domain thereby generating a plurality of spatial sub-tensors;
based, at least in part, on the plurality of spatial sub-tensors, generating output image data;
using the known region of the input image tensor and based, at least in part, on a region, of the output image data, that corresponds to the missing region of the input image tensor, generating a final output image.

18. The system of claim 17, wherein the plurality of spectral sub-tensors correspond to a plurality of frequency bands that includes the particular frequency band, and wherein the plurality of frequency bands includes at least one low frequency band and at least one high-frequency band.

19. The system of claim 18,
wherein a low-frequency split spectral sub-tensor of the plurality of spectral sub-tensors corresponds to the at least one low frequency band, a high-frequency split spectral sub-tensor of split spectral sub-tensors corresponds to the at least one high-frequency band;
wherein performing the inverse transform of the plurality of the split spectral sub-tensors from the frequency domain to the spatial domain includes generating a low-detail spatial sub-tensor from the low-frequency split spectral sub-tensor of the plurality of spectral sub-tensors, and generating a high-detail spatial sub-tensor from the high-frequency split spectral sub-tensor of the plurality of spectral sub-tensors;
wherein the set of instructions includes instructions, which, when executed by the one or more processors, cause merging the low-detail spatial sub-tensor with a tensor of a smaller dimension layer of a decoder, and merging the high-detail spatial sub-tensor with a tensor of a greater dimension layer of the decoder, the decoder generating the output image data.

20. The system of claim 17, wherein a size of the gaussian map is based on resolution of the image data or calculated as a parameter of a machine learning model.

* * * * *